Oct. 11, 1932.  R. F. PEO  1,881,960

SWAY PREVENTING DEVICE

Filed July 21, 1931  2 Sheets-Sheet 1

INVENTOR
Ralph F. Peo
BY
ATTORNEY

Oct. 11, 1932.   R. F. PEO   1,881,960
SWAY PREVENTING DEVICE
Filed July 21, 1931   2 Sheets-Sheet 2
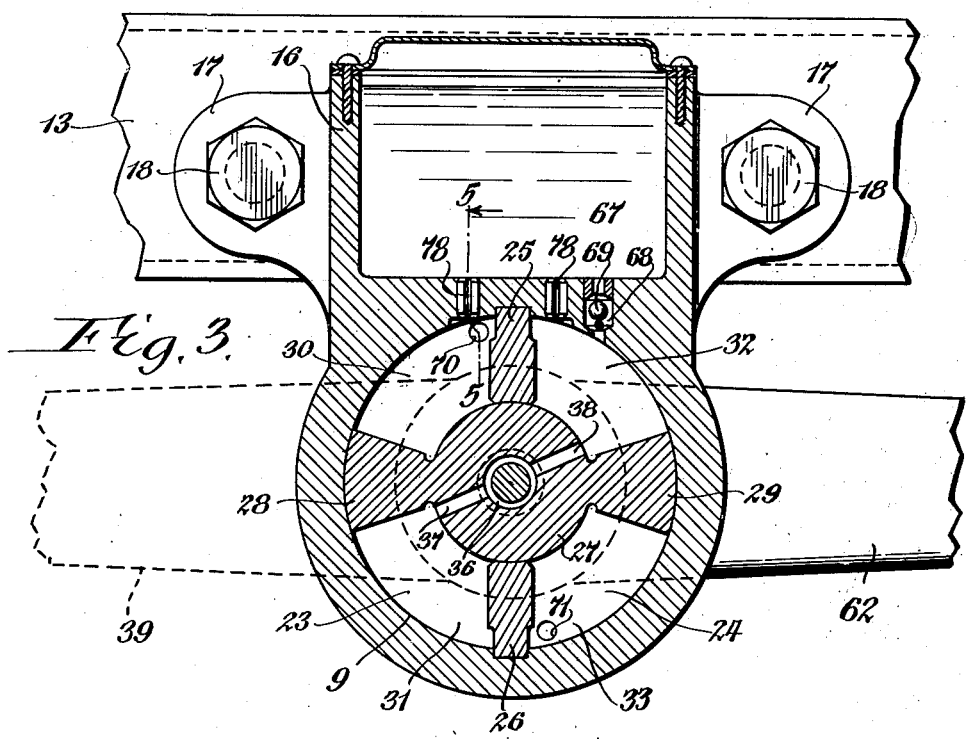
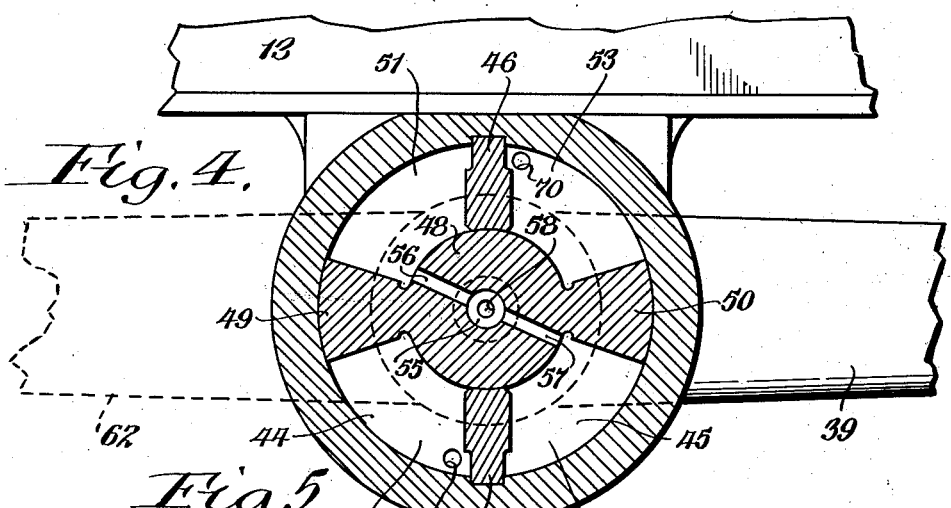
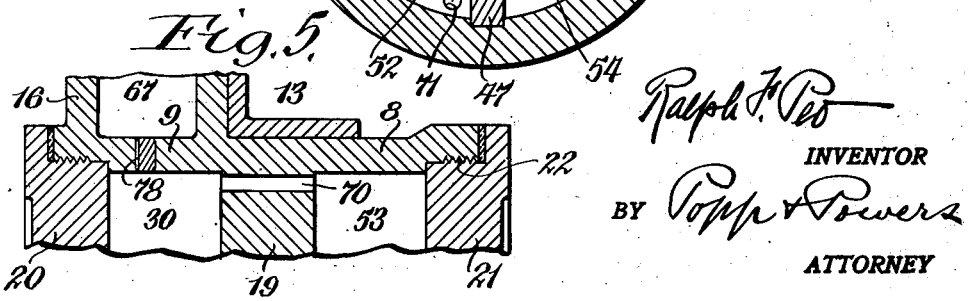
Ralph F. Peo
INVENTOR
BY Popp & Powers
ATTORNEY Patented Oct. 11, 1932

1,881,960

UNITED STATES PATENT OFFICE

RALPH F. PEO, OF BUFFALO, NEW YORK, ASSIGNOR TO HOUDE ENGINEERING CORPORATION, OF BUFFALO, NEW YORK, A CORPORATION OF NEW YORK

SWAY PREVENTING DEVICE

Application filed July 21, 1931. Serial No. 552,148.

This invention relates to a device for preventing the body of an automobile from swaying when rounding corners, or when one wheel passes over a bump or drops into a hole, and thereby tends to tilt the rear end of the chassis and the body mounted thereon.

It is the object of this invention to provide a device for this purpose which is simple and compact in construction, efficient in operation and capable of being installed on an automobile so as to become a definite part of its chassis.

In the accompanying drawings:

Figs. 3 and 4 are vertical transverse sections taken on the correspondingly numbered lines in Fig. 2 and looking in the direction of the arrows associated with these figures.

Fig. 5 is a fragmentary vertical longitudinal section taken on line 5—5, Fig. 3.

In the following description similar characters of reference indicate like parts in the several figures of the drawings.

Figure 1:
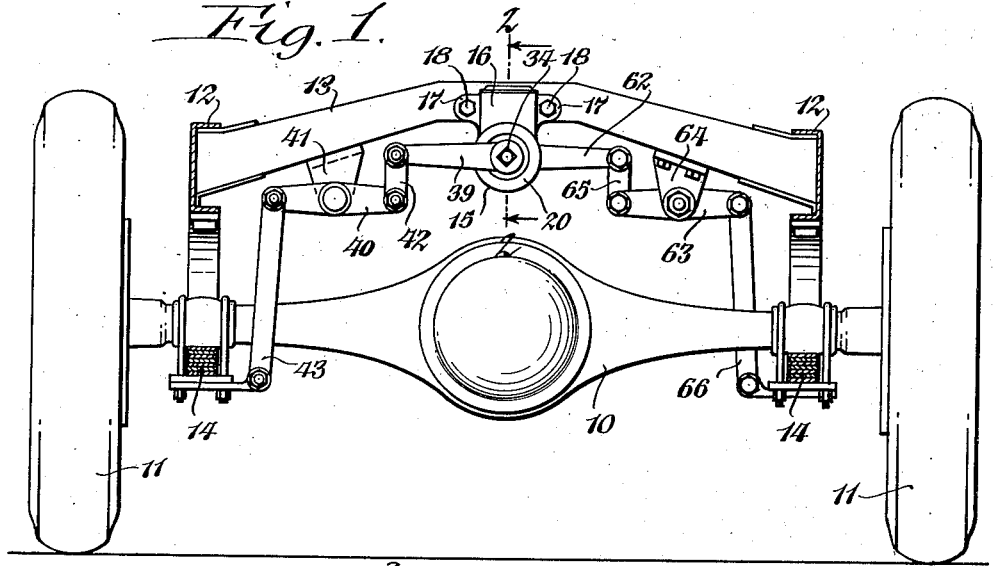
Fig. 1 is a rear elevation of an automobile chassis equipped with my improved sway preventing device.
Figures 2, 6:
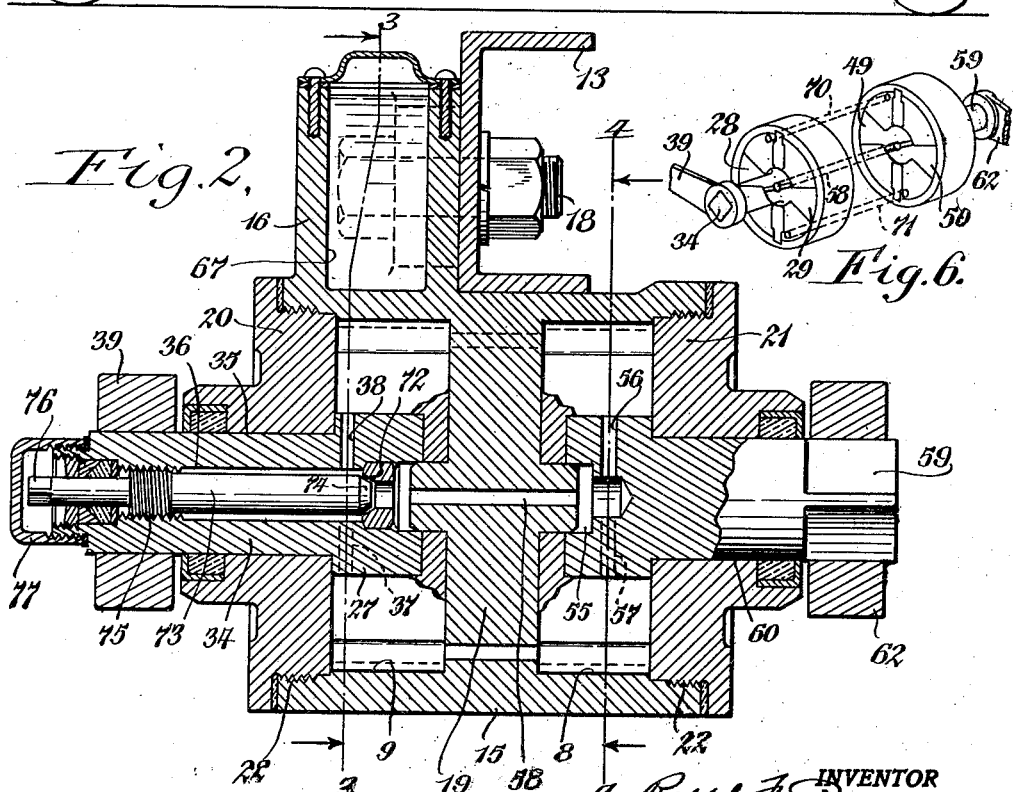
Fig. 2 is a vertical longitudinal section, on an enlarged scale, taken on line 2—2, Fig. 1.
Fig. 6 is a diagrammatic view of a shock absorber for the purpose of showing the liquid passages between different chambers of the apparatus.

Although the chassis of the automobile or other vehicle for which this invention is intended may be variously constructed that shown in the drawings comprises a rear axle 10 which is provided at its opposite ends with wheels 11 whereby the axle is supported upon the floor or roadway, a frame arranged above the axle and having two longitudinal side bars 12 and one or more cross bars 13 connecting the side bars, and spring means for yieldingly connecting the frame and axle of the chassis and consisting in the present case of leaf springs 14 each of which is connected with one of the side bars of the frame and the adjacent end of the axle 10, as shown in Fig. 1. This sway preventing device is interposed between two relatively movable members of the chassis on opposite sides of the longitudinal center of the frame or car and in the present case the same is interposed between the frame member and the axle member of the car. This sway preventing or retarding device which embodies my improvements operates upon the principle of a hydraulic shock absorber and in the preferred organization of the same, as shown in the drawings, is constructed as follows:

The numeral 15 represents the body of the sway preventing device which is rigidly mounted on one of the relatively movable members of the chassis in line with the longitudinal center thereof. This is preferably accomplished by arranging this body lengthwise underneath one of the cross bars 12 of the frame member and providing the upper side of this body with an upwardly extending boss 16 the opposite lateral sides of which are provided with lugs 17 which are secured by means of bolts 18 to the rear side of said cross bar, as best shown in Figs. 1, 2 and 3. The body 15 is provided midway of its length with an upright fixed inner head of partition 19 and at its opposite ends with removable outer heads 20, 21 each of which is connected with the respective end of the body by means of the screw joint 22. Between the fixed intermediate head 19 of the body and the rear removable head 20 thereof the rear part of the body is bored out to form a cylinder 9 and between this intermediate head and the front head 21 thereof the front part of the body is bored to form a front cylinder 8. The rear cylinder 9 is divided into two semi-cylindrical working chambers 23, 24 by a partition consisting of upper and lower radial sections 25, 26 which are arranged on diametrically opposite sides of the axis of the respective cylinder and have their outer ends connecting with the periphery of the cylinder and their opposite lateral edges connected with the respective heads of the cylinder while the inner ends of these partition sections are spaced apart. Arranged axially within the rear cylinder 9 is a circular hub 27 on diametrically opposite sides of which are arranged two pistons 28, 29 which oscillate respectively in the semi-cylindrical working chambers 23, 24, as shown in Figs. 2, 3 and 6. For convenience in describing the function or operation of this device the upper and lower ends 30, 31 of the working chamber 23 will be regarded as the low pressure and high pressure ends of the same and for the same reason the upper and lower ends 32, 33 of the companion working chamber 24 will be regarded as the high pressure and low pressure ends of the same.

The numeral 34 represents a rocking or oscillating operating shaft which projects rearwardly from the hub 27 and is journaled in a bearing 35 formed in the rear head 20 of the body. Arranged axially within the shaft 34 is a valve chamber 36 which communicates at its inner or front end by means of radial passages 37, 38, in the hub 27 with the high pressure ends 31 and 32 of the working chambers 23 and 24. Motion is transmitted to the rock shaft 34 or oscillating pistons 28 and 29 upon movement of the chassis members relative to each other, this being accomplished as shown in the drawings, as an example, by means comprising a rocking operating arm 39 connected with the rear or outer end of the operating shaft 34 and extending laterally in one direction from the axis thereof, for example toward the left of the chassis as shown in Fig. 1, an intermediate rock lever 40 pivoted to swing vertically on a bracket 41 secured to the underside of the adjacent part of the cross bar 13, an inner link 42 connecting the inner arm of the intermediate lever 40 with the outer end of the operating arm 39 and an outer link 43 connecting the outer arm of the intermediate lever 40 with the adjacent outer end of the axle 10 which latter constitutes the other member of the chassis which is moved relative to the frame thereof.

The cylinder 8 is divided into two semi-cylindrical working chambers 44, 45 by means of a partition consisting of two upright partition sections 46, 47 arranged on diametrically opposite sides of the axis of the cylinder 8 and connected at their outer ends with the periphery of the cylinder and at their opposite lateral edges with the respective intermediate head 19 and front head 21 of the cylinder while their inner ends are spaced apart. Rotating concentrically within the cylinder 8 and in engagement with the opposing inner ends of the partition sections 46 and 47 is a hub 48 which is provided on diametrically opposite sides with pistons 49 and 50 which oscillate respectively in the working chambers 44 and 45 of the respective cylinder 8. For convenience in description the upper and lower ends 51 and 52 of the working chamber 44 will be regarded as the low pressure end and high pressure end of this working chamber and for like reason the upper and lower ends 53 and 54 of the other working chamber 45 will be regarded as the high pressure end and the low pressure end respectively of this last mentioned working chamber.

Arranged centrally within the hub of the piston 48 is a distributing chamber 55 which communicates by means of radial passages 56 and 57 in this hub with the low pressure chamber 51 and the high pressure chamber 55 respectively. Communication between the valve chamber 36 and the distributing chamber 55 is effected by means of a longitudinal passage 58 formed axially in the partition 19 and opening at its rear end to the valve chamber 36 and at its front end to the distributing chamber 55, as best shown in Fig. 2.

From the front side of the piston 48 an operating shaft 59 projects forwardly and is journaled in a bearing 60 formed centrally in the front head 21. A rocking motion is imparted to this last mentioned shaft 59 by relative movement between the opposite end of the axle and the frame of the chassis which transmitting means in their preferred construction comprise an operating arm 62 secured to the front end of the shaft 59 and extend radially therefrom in the direction opposite to that of the companion arm 39, an intermediate rock lever 63 pivotally mounted so as to swing vertically on a bracket 64 secured to the underside of the adjacent part of the frame cross bar 13, an inner link 65 connecting the inner arm of the rock lever 63 with the outer end of the rock arm 62 and an outer link 66 connecting the outer arm of the intermediate rock lever 63 with the outer adjacent opposite end of the axle 10, as shown in Fig. 1.

The working chambers and the conduits in communication therewith are filled with a resistance liquid which is adapted to prevent the swaying action or at least check or retard the same when a cause for such action occurs while the automobile is rounding a curve or the wheels run over an obstruction in the road or drop into a hole therein. The working chambers are constantly maintained in a filled condition for this purpose and if replenishing of this liquid becomes necessary this is automatically supplied to the working chambers from replenishing chamber 67 which is preferably formed in the upwardly extending boss 16 and in the preferred construction replenishing liquid is supplied from this chamber 67 directly to the working chambers of one of the cylinders and indirectly to the working chambers of the other cylinder. As shown in the drawings direct communication is established between the lower end of the replenishing chamber 67 and the upper end 32 of the working chamber 24 by a port 68 formed in the upper part of the cylinder 9 which port contains a check valve 69 which closes toward the replenishing chamber 67 but opens toward the upper end of the respective working chamber, as shown in Fig. 3. Resistance liquid is supplied from this replenishing chamber 67 indirectly to the upper low pressure end 51 of the working chamber 44 and the lower end 54 of the working chamber 45 through the medium of the radial passages of the low pressure end 31 of the working chamber 23, the high pressure end 32 of the working chamber 24, the radial passages 37 and 38 of the hub 27, the valve chamber 36, the communicating passage 58, distributing chamber 55 and the radial passages 56 and 57 in the hub 48, and also by liquid circulating conduit 70 formed in the upper part of the central head 19 which connects the upper low pressure end 30 of the working chamber and the upper high pressure end 53 of the working chamber 45 and by a lower liquid circulating conduit 71 formed in the lower part of the central head 19 and connecting the lower high pressure end 52 of the working chamber 44 with the lower low pressure end 33 of the working chamber 24, as shown in Figs. 2, 3, 4, 5 and 6.

Leakage of the rate of flow of the resistance liquid back and forth between the high and low pressure ends of the working chambers of the respective cylinders is controlled by means of a valve seat 72 arranged in the hub 27 of the rear cylinder between the radial passages or ports 37, 38 and the intermediate conduit 58, and a valve stem 73 arranged axially in the valve chamber and provided at its front or inner end with a valve 74 which is capable of adjustment toward and from the valve seat 72 by means of a screw connection 75 with the rear end of the shaft 34. Rotation of this valve stem is preferably effected from the exterior of the apparatus by applying a wrench, key or other instrument to the rear hexagonal end 76 of the valve stem which latter end is covered after such adjustment has been effected by means of a screw cap 77 applied to the rear end of the shaft 34, as shown in Fig. 2.

Any air which may be trapped in the resistance liquid is permitted to escape therefrom into the replenishing chamber through vent ports 78 formed in that part of the peripheral wall of the cylinder 9 between the bottom of the replenishing chamber 67 and the upper ends 30 and 32 of the working chambers 23 and 24, as shown in Fig. 3.

The operation of this apparatus is as follows: When the frame and axle of the automobile move vertically toward and from each other a uniform extent on opposite sides of the longitudinal center when the wheels pass over obstructions in the road or drop into holes therein then the two pistons in the respective cylinders operate in like manner on the resistance liquid therein and the pistons and liquid in either of these cylinders does not influence the liquid and the pistons in the other cylinder and the parts associated therewith but the pistons in both of these cylinders in conjunction with the resistance liquid therein operate to absorb the shock and retard the relative movement of the frame member and the axle member of the chassis toward and from each other. During such action, assuming that the wheels are passing to a like extent over the obstruction in the road which will produce what will be regarded as a high pressure stroke on the part of the pistons in the respective cylinders, then the piston 28 will move downwardly toward the high pressure end 31 of the working chamber 23 and the piston 29 will move upwardly toward the high pressure end 32 of the working chamber 24, thereby expelling liquid through the passages 37 and 38, valve 36, intermediate passage 58, distributing chamber 55 and radiated passages 56 and 57 to the upper low pressure end 51 of the working chamber 44 and the low pressure end 65 of the working chamber 45 and at the same time the pistons 49 will move downwardly toward the high pressure end of the working chamber 44 so as to cause resistance liquid to be forced from the lower high pressure end 52 of the working chamber 44 through the port 71 into the low pressure end 33 of the working chamber 24 and the piston 50 will move toward the high pressure end 53 of the working chamber 45 and thereby force resistance liquid from the high pressure end 52 of the working chamber 44 into the low pressure end 33 of the working chamber 24 and also force resistance liquid from the high pressure end 53 of the working chamber 45 through the passage 70 into the upper low pressure end 30 of the working chamber 23. In view of the fact that resistance liquid at this time is merely displaced from the high pressure ends of the working chambers of the two cylinders to the low pressure ends of the same in like measure no appreciable retarding or checking effect so far as swaying or tilting of the body of the frame relative to the axle occurs, only a moderate resistance to the bodily movement of the axle toward the frame due to the frictional resistance encountered by the liquid in moving through the various passages connecting the high pressure end of the chambers of the respective cylinders with the low pressure ends of the working chambers therein. When both of the wheels of an axle drop simultaneously into holes of the same depth or substantially so which movement for the purpose of this description is regarded as a low pressure movement, then the movement of the several pistons is reversed to that just described and the resistance liquid is forced by these pistons out of the low pressure ends of the respective working chambers into the high pressure ends of the working chambers in the respective cylinders through the same passages previously described but in an opposite direction. During this last mentioned action the axle member moves bodily away from the frame member of the chassis without any tilting or swaying action and only such resistance to such movement is experienced which is produced by the friction of the liquid through the several passages which connect the high pressure ends of the working chamber with the low pressure ends of the same.

When, however, only the wheel and one end of an axle runs over an obstruction in the roadway and produces a high pressure stroke of the pistons in one of the cylinders then the resistance liquid therein is expelled therefrom under pressure into the low pressure ends of the working chambers of the other cylinder and compels the last mentioned pistons to also move in a direction in which they would move if the corresponding wheel of the axle moved over an obstruction thereby causing that side of the frame over that end of the axle which has not been raised to be lifted an extent corresponding to that side of the frame which has been lifted on the side which corresponds to that end of the axle which has been raised by passing over an obstruction. By this means both parts of the frame on opposite sides of the longitudinal center of the car are raised uniformly instead of permitting the frame and the car body resting thereon to sway or tilt from one side to the other.

A like action results when a wheel at one end of an axle drops into a hole in the roadway during which time the resistance liquid will be expelled by the pistons associated with the respective end of the axle and caused to enter the high pressure ends of the working chambers of the other cylinder and compel the pistons in the last mentioned cylinder to move in a corresponding direction and pull down the corresponding side of the frame together with the body resting thereon in order to prevent swaying or tilting of the body at this time.

If the body should tend to sway as the automobile turns around a corner such a swaying is either wholly prevented or at least retarded by the rotary movement of the cylinders relative to the pistons therein so that at one time the resistance liquid will be expelled from the high pressure ends of the working chambers of one cylinder into the low pressure ends of the other working chamber when the automobile turns in one direction and the resistance liquid will be discharged from the low pressure ends of the working chambers of one cylinder into the high pressure ends of the working chambers in the other cylinder so as to cause the pistons through the medium of the rock arm, links and levers to produce an equalizing or stabilizing effect on the body and prevent or, at least, retard any swaying or tilting action of the same.

By adjusting the valve stem 73 this retarding effect of the resistance liquid can be regulated in accordance with the load imposed upon this device.

Owing to the simplicity of construction of this device the same is very compact and can be readily installed on automobiles in which a limited space is available for this purpose and it also enables a device of this character to be readily standardized and made a unitary part of the automobile.

I claim as my invention:

1. A sway preventing device for an automobile having an axle member and a frame member mounted by spring means on said axle member, comprising two cylindrical bodies mounted on one of said members and each adapted to contain a resistance liquid, partition means dividing each of said cylindrical bodies into two semi-cylindrical working chambers, a pair of connected pistons oscillating respectively in the working chambers of each of said bodies and each piston dividing the respective working chamber into a high pressure end and a low pressure end, conduit means connecting the high pressure end of a working chamber of one of said bodies with a low pressure end of a working chamber of the other body, and motion transmitting means connecting said pairs of pistons of the respective bodies with said other member on opposite sides of the longitudinal center of the frame.

2. A sway preventing device for an automobile having an axle member and a frame member mounted by spring means on said axle member, comprising two cylindrical bodies mounted on one of said members and each adapted to contain a resistance liquid, partition means dividing each of said cylindrical bodies into two semi-cylindrical working chambers, a pair of connected pistons oscillating respectively in the working chambers of each of said bodies and each piston dividing the respective working chamber into a high pressure end and a low pressure end, conduit means connecting the high pressure end of a working chamber of one of said bodies with a low pressure end of a working chamber of the other body, said bodies being arranged axially in line and having their inner ends opposite each other and provided at their outer ends, respectively, with bearings, rock shafts journaled respectively in said bearings and each connected at its inner end with one pair of said pistons, and operating means connecting the outer ends of said rock shafts, respectively, with said other member on opposite sides of the longitudinal center of said frame.

3. A sway preventing device for an automobile having an axle member and a frame member mounted by spring means on said axle member, comprising two cylindrical bodies mounted on one of said members and each adapted to contain a resistance liquid, partition means dividing each of said cylindrical bodies into two semi-cylindrical working chambers, a pair of connected pistons oscillating respectively in the working chambers of each of said bodies and each piston dividing the respective working chamber into a high pressure end and a low pressure end, conduit means connecting the high pressure end of a working chamber of one of said bodies with a low pressure end of a working chamber of the other body, said bodies being arranged axially in line and having their inner ends opposite each other and provided at their outer ends, respectively, with bearings, rock shafts journaled, respectively, in said bearings and each connected at its inner end with one pair of said pistons, operating means connecting the outer ends of said rock shafts, respectively, with said other member on opposite sides of the longitudinal center of said frame, including rock arms secured to the outer ends of said rock shafts and projecting in opposite directions therefrom, intermediate rock levers mounted on the same member which carries said bodies, a link connecting one end of each intermediate lever with one of said rock arms, and a link connecting the opposite end of the respective intermediate lever with the other of said members.

4. A sway preventing device for an automobile having an axle member and a frame member mounted by spring means on said axle member, comprising two cylindrical bodies mounted on one of said members and each adapted to contain a resistance liquid, partition means dividing each of said cylindrical bodies into two semi-cylindrical working chambers, a pair of connected pistons oscillating respectively in the working chambers of each of said bodies and each piston dividing the respective working chamber into a high pressure end and a low pressure end, conduit means connecting the high pressure end of a working chamber of one of said bodies with a low pressure end of a working chamber of the other body, said bodies being arranged axially in line and having a common inner head and having individual outer heads each of which has a bearing, rock shafts journaled in said bearings and each connected at its inner end with one of said pairs of pistons, said inner common head having a longitudinal passage which communicates at one end with the working chambers of one of said bodies, and the rock shaft journaled in the bearing of the other body having a longitudinal valve chamber which communicates with the working chambers of the other body and also communicates with the passage in said common head, and valve means arranged in said valve chamber for controlling the flow of resistance liquid through said passage from the working chambers in one body to the working chamber in the other body.

5. A sway preventing device for an automobile having an axle member and a frame member connected by spring means with said axle member, comprising two working chambers arranged axially in line and having their inner ends opposing one another and provided in their outer ends with bearings, pistons oscillating in said chambers and each dividing the same into a high pressure end and a low pressure end, conduit means connecting a high pressure end of one of said chambers with a low pressure end of the other chamber, rock shafts journaled in said bearings and each having its inner end connected with the piston in the respective body, and operating means extending in opposite directions from the outer ends of said shafts and connected respectively with said other member on opposite sides of the longitudinal center of the frame.

6. A sway preventing device for an automobile having an axle member and a frame member connected by spring means with said axle member, comprising two working chambers arranged axially in line and having their inner ends opposing one another and provided in their outer ends with bearings, pistons oscillating in said chambers and each dividing the same into a high pressure end and a low pressure end, conduit means connecting a high pressure end of one of said chambers with a low pressure end of the other chamber, rock shafts journaled in said bearings and each having its inner end connected with the piston in the respective body, operating means extending in opposite directions from the outer ends of said shafts and connected respectively with said other member on opposite sides of the longitudinal center of the frame, and a single liquid replenishing chamber communicating directly with one of said working chambers and indirectly with the other working chamber.

7. A sway preventing device for an automobile having an axle member and a frame member connected by spring means with said axle member, comprising two working chambers arranged axially in line and having their inner ends opposing one another and provided in their outer ends with bearings, pistons oscillating in said chambers and each dividing the same into a high pressure end and a low pressure end, conduit means connecting a high pressure end of one of said chambers with a low pressure end of the other chamber, rock shafts journaled in said bearings and each having its inner end connected with the piston in the respective body, operating means extending in opposite directions from the outer ends of said shafts and connected respectively with said other member on opposite sides of the longitudinal center of the frame, and a liquid replenishing chamber communicating with said working chambers and serving as means for mounting said bodies on the respective member of the automobile.

In testimony whereof I hereby affix my signature.

RALPH F. PEO.